Figure 4:
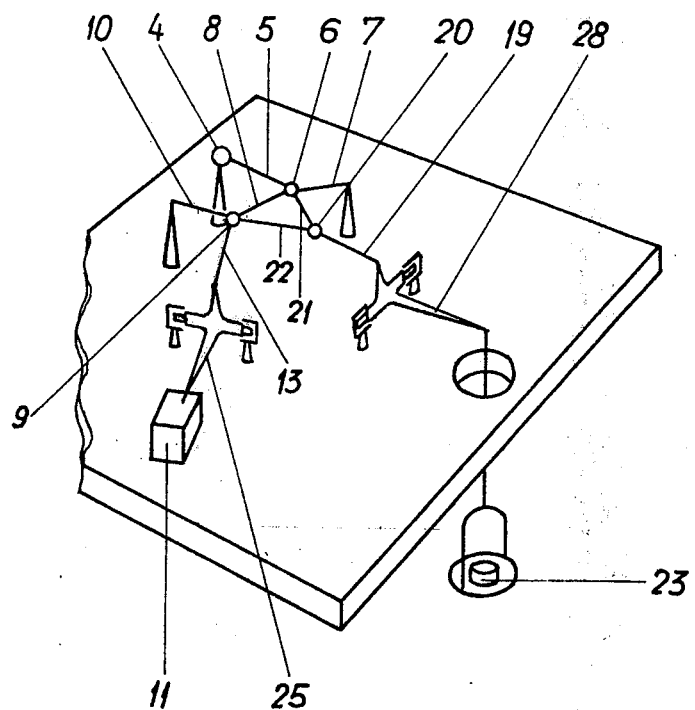

United States Patent [19]

Gallo

[11] 4,010,638
[45] Mar. 8, 1977

[54] MASS AND FORCE METER

[75] Inventor: Mario Gallo, Zurich, Switzerland

[73] Assignee: Wirth Gallo and Company, Switzerland

[22] Filed: May 28, 1976

[21] Appl. No.: 691,094

[30] Foreign Application Priority Data

Feb. 9, 1976 Switzerland ............... 001577/76

[52] U.S. Cl. .................. 73/141 R; 73/DIG. 1; 177/210 FP

[51] Int. Cl.² ........................ G01L 1/10

[58] Field of Search .......... 73/88 R, 88.5 R, 141 R, 73/DIG. 1, 517 AV; 177/210 R, 210 FP

[56] References Cited

UNITED STATES PATENTS

| | | | |
|---|---|---|---|
| 3,423,999 | 1/1969 | Wirth et al. | 73/141 R |
| 3,621,713 | 11/1971 | Wirth et al. | 73/DIG. 1 |
| 3,692,128 | 9/1972 | Gallo | 73/141 R X |
| 3,724,573 | 4/1973 | Saner | 73/DIG. 1 |
| 3,805,605 | 4/1974 | Saner | 73/DIG. 1 |
| 3,885,427 | 5/1975 | Melcher et al. | 73/141 R |

Primary Examiner—Richard C. Queisser
Assistant Examiner—Charles Gorenstein
Attorney, Agent, or Firm—Stevens, Davis, Miller & Mosher

[57] ABSTRACT

A mass and force meter having a frame, a load support and a digital computing device, a first and a second electrically excited, transversely vibrating string, first transmission elements transmitting the mass or force to be measured to said strings, second transmission elements transmitting a pre-loading force to said strings, so that the resultant frequency variations caused by the application of said mass or force are used in the computing and display device for computation of the magnitude of said mass or force, said first transmission elements having a first and a second branch, a first guide fixed to the frame, said first string having one end fastened to said frame and the other end connected to one end of said second string, to said first guide and to said first branch of said first transmission elements, a second guide fixed to the frame, the other end of said second string being connected to said second guide, to said second transmission elements and to said second branch of said first transmission elements.

2 Claims, 4 Drawing Figures

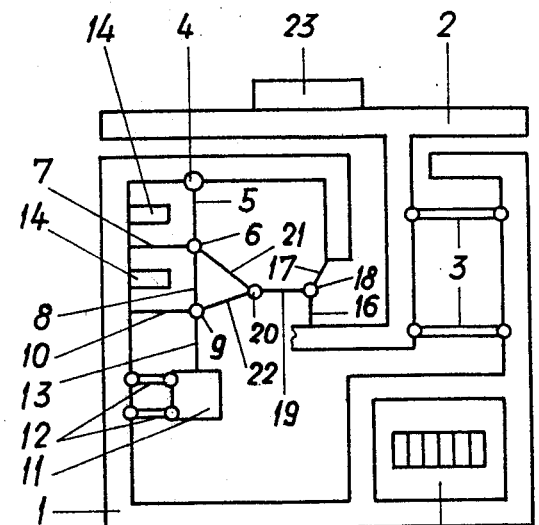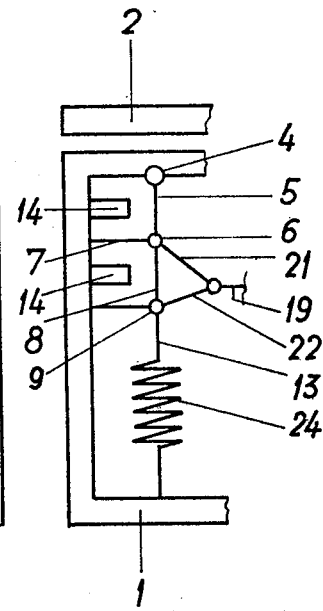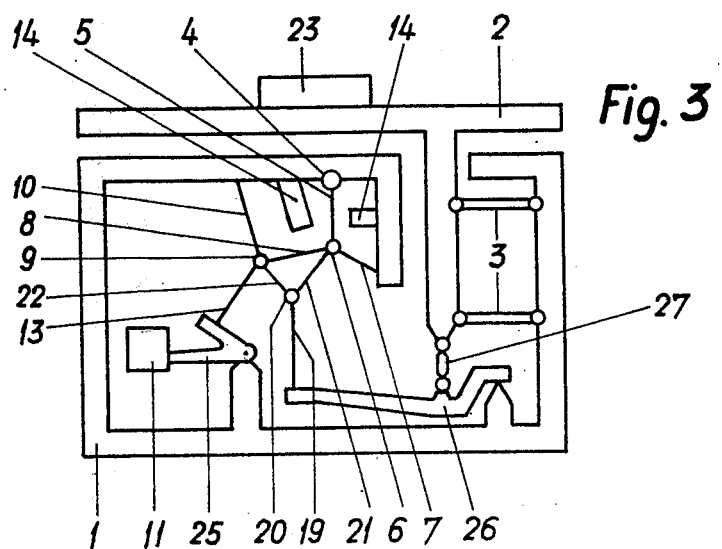

MASS AND FORCE METER

The present invention relates to a mass and force meter having a frame, a load support and a computing device, wherein the mass or force to be measured is transmitted by means of first transmission elements to two transversely vibrating strings to which a preloading force is transmitted by means of second transmission elements, so that the resultant frequency variations caused by the application of said mass or force is used in the computing device for computation of the magnitude of said mass or force.

Such meters are well known. In U.S. Pat. No. 3,612,198 for instance, a meter is described wherein a first vibrating string to which the load support is suspended is fixed to the frame and a second vibrating string to which a pre-loading mass is suspended is fixed to the load support. This second string is under the action of the pre-loading mass only, the first string being under the action of the pre-loading mass and additionally under that of the weight of the mass to be measured. In U.S. Pat. No. 3,423,999 a meter is described in which both strings are mounted in V form and have one end fastened to the frame. They are evenly loaded by the weight of a pre-loading mass and unevenly loaded by the load.

In the first of these meters the fact that one string is under the action of the load only has two drawbacks. In order to obtain the result of the measurement a relatively complicated computation is needed. The adjustment of the meter (for compensation of the manufacturing tolerances) for all parameters is not possible. This drawback is avoided in the meter according to U.S. Pat. No. 3,423,999because both forces act on both strings, However, this meter is more expensive as a force distributor is needed. The arrangement of the strings is such, that one of their ends is fastened to the frame and the other ends are both fastened to two force transmission elements transmitting the pre-loading force and the load, so that both strings and both transmission elements radiate from the same point. The arrangement of the strings in U.S. Pat. No. 3,612,198 is such, that one string is mounted between the frame and the load support, the other one between the load support and the pre-loading mass. The isolation of both strings from their fastening heads with regard to vibrations in the range of their frequencies is difficult. In the first case two fastening heads are required for each string, in the second case all four fastening heads must be provided with filters. These filters are well known, but they represent a greater part of the total cost of the meter. They encrease the resilience of the measuring system which, in turn, has statical and dynamical drawbacks. It is therefore desirable to avoid these filters or to combine them with other necessary or useful parts (for instance in order to achieve a certain transmission ratio or a statically determined guidance of the system).

It is an object of the invention to provide a mass and force meter in which the distribution of both forces on both strings is adjustable separately for each string over a wide range, the whole system remains always statically determined and the share of cost caused by filters as well as the total cost remain small.

Another object of the invention is a mass and force meter which is achieved in that the first transmission elements comprise two branches, one end of the first string is fixed to the frame, its other end being connected with one end of the second string, by means of at least one guide with the frame and with one branch of the first transmission elements, and where the other end of the second string is connected by means of at least one guide with the frame, with the second transmission elements and with the other branch of the second transmission elements.

A further object of the invention is a mass and force meter having a frame, a load support, and a digital computing device, a first and a second electrically excited, transversely vibrating string, first transmission elements transmitting the mass or force to be measured to said strings, second transmission elements transmitting a pre-loading force to said strings, so that the resultant frequency variations caused by the application of said mass or force is used in the computing and display device for computation of the magnitude of said mass or force, said first transmission elements having a first and a second branch, a first guide fixed to the frame, said first string having one end fastened to said frame and the other end connected to one end of said second string, to said first guide and to said first branch of said first transmission elements, a second guide fixed to the frame, the other end of said second string being connected to said second guide, to said second transmission elements and to said second branch of said first transmission elements.

Embodiments of the object of the invention are shown schematically in the accompanying drawings.

FIG. 1 shows a first embodiment,
FIG. 2 shows a variant to FIG. 1,
FIG. 3 shows a second embodiment, and
FIG. 4 shows a third embodiment.

The embodiment shown in FIG. 1 is a mass meter, i.e., a scale. It has a frame 1 to which a load support 2 is fixed by means of guides 3. These guides 3 guide load support 2 parallely and vertically. By means of a fastening head 4 acting as low band filter and first vertically mounted string 5 is fixed to frame 1. A joint 6 is fixed to its lower end. A wirelike guide 7 is mounted horizontally between frame 1 and joint 6. The upper end of a second string 8 is fixed to joint 6 and its lower end to a further joint 9. A wirelike guide 10 is mounted horizontally between frame 1 and joint 9. Below joint 9 a pre-loading mass 11 is fixed to frame 1 by means of guides 12. It is guided parallely and vertically. The weight of pre-loading mass 11 is transmitted by a wire 13, acting as transmission element, to joint 9 and acts as pre-loading tension for both strings 5 and 8. These are mounted in series with regard to the pre-loading tension. Both strings 5 and 8 are equally loaded by this pre-loading tension. In case a differentiated pre-loading tension of the strings is required, the magnitude of the pre-tension of each string 5 and 8 can be adjusted by a corresponding adjustment of guides 7 or 10 respectively.

As well known in the art, exciting and sensing heads 14 are mounted in frame 1 next to strings 5,8. They are connected to a computing and display device 15.

Two wires 16, 17 and a joint 18 connect load support 2 to frame 1. A wire 19 is mounted horizontally and connects joint 19 to a joint 20, which in turn is connected to joints 6 and 9 by means of two wires 21 and 22 respectively. The weight of mass 23, whose magnitude must be measured, acts as measuring force in wire 19. Wire 19 together with wires 21, 22 constitutes the transmission element for this measuring force which depends only on the weight of mass 23. Strings 5, 8 are stretched by the pre-loading tension and guided by guides 7, 10. As a consequence these strings 5, 8 and both guides 7, 10 determine exactly the position of joints 6 and 9, with or without a pulling force acting on wires 21 and 22. As a further consequence the positions of joint 20 and of joint 18 are determined as well. Load support 2 is supported in a statically determined way by the system formed by the strings and the wires.

The measuring force acting in wire 19, i.e., the force depending upon mass 23 to be determined, is distributed unevenly on both strings 5, 8 over the two branches of the force distributor formed by wires 21, 22. In the embodiment represented the measuring force component in wire 21 loads string 5 additionally to the pre-loading tension. The measuring force component in wire 22 relieves both strings 5 and 8. The amount of relief is smaller than the amount of additional stress on string 5. The ratio of the measuring force components is equal to the ratio of the angles of wires 21, 22 with the horizontal direction. These angles determine the factor of multiplication or reduction with which the measuring force is applied to strings 5 and 8.

As well known in the art, strings 5 and 8 are excited by heads 14 and their frequencies are transmitted to computing and display device 15. The action of the measuring force provokes a variation of these frequencies which is used by device 15 for computing and displaying the magnitude of mass 23.

In FIG. 2 a variant of the embodiment according to FIG. 1 is represented. Pre-loading mass 11 is replaced by a tension spring 24 fixed to frame 1 and to the lower end of wire 13. The meter is now basically a force meter, it can be used as mass meter as well.

In FIG. 3 the embodiment represented is a scale, too. The difference between this embodiment and that of FIG. 1 resides primarily in that the arrangement of strings 5 and 8 of guides 7 and 10 and of wires 13, 19, 21 and 22 is different. Pre-loading mass 11 is fixed to the longer arm of a two-arm lever 25 pivotally mounted in frame 1. The other arm of this lever 25 is connected to joint 9 by means of a wire 13. The weight of pre-loading mass 11 is hereby multiplied and acts as pre-loading mass 11 is hereby multiplied and acts as pre-loading force on strings 5 and 8. Because of the chosen arrangement of guides 7 and 10, this pre-loading force is unevenly distributed on strings 5, 8. The pre-loading tension of each string can be adjusted individually by means of a corresponding adjustment of guides 7 and 10. A second lever 26 is pivotally mounted in frame 1. Load support 2 is connected to this lever 26 by means of a vertical rod 27. The free end of lever 26 is connected to joint 20 by means of a wire 19.

In FIG. 4 a third embodiment is very schematically represented, in which strings 5 and 8 are located in a horizontal plane. The weight of mass 23 is then transmitted over a further two-arm lever 28 to which wire 19 is connected.

In the embodiment according to FIG. 1–3 it has been assumed that all important elements (i.e., the strings, the guides and the transmission elements) are located in the same vertical plane. For this reason a single guide 7 or 10 respectively is enough for determining together with the other elements the position of joints 6 or 9 respectively. If these important elements are not located in the same vertical plane, more than one guide 7 or 10 must be provided. These guides 7 and 10 have been represented as wire under traction. If mounted symmetrically, they could be replaced by pressure rods with one end fixed to the corresponding joint (6 or 9) and the other end in contact with frame 1.

I claim:

1. A mass and force meter having a frame, a load support and a digital computing device, a first and second electrically excited, transversely vibrating string, first transmission elements transmitting the mass or force to be measured to said strings, second transmission elements transmitting a pre-loading force to said strings, so that the resultant frequency variations caused by the application of said mass or force are used in the computing and display device for computation of the magnitude of said mass or force, said first transmission elements having a first and a second branch, a first guide fixed to the frame, said first string having one end fastened to said frame and the other end connected to one end of said second string, to said first guide and to said first branch of said first transmission elements, a second guide fixed to the frame, the other end of said second string being connected to said second guide, to said second transmission elements and to said second branch of said first transmission elements.

2. A mass and force meter having a frame, a load support and a digital computing device, a first and a second electrically excited, transversely vibrating string mounted vertically in said frame, first transmission elements transmitting the mass or force to be measured to said strings, second transmission elements transmitting a pre-loading force to said strings, so that the resultant frequency variations caused by the application of said mass or force are used in the computing and display device for computation of the magnitude of said mass or force, said first transmission elements having a first and a second branch, a first guide mounted horizontally and fixed to the frame, said first string having one end fastened to said frame and the other end connected to one end of said second string, to said first guide and to said first branch of said first transmission elements, a second guide mounted horizontally and fixed to the frame, the other end of said second string being connected to said second guide, to said second transmission elements and to said second branch of said first transmission elements.

* * * * *